United States Patent

Kunig

[11] Patent Number: 5,085,140
[45] Date of Patent: Feb. 4, 1992

[54] PRESSER BELT SEPARATING APPARATUS

[75] Inventor: Helmut Kunig, Bad Schwartau, Fed. Rep. of Germany

[73] Assignee: Nordischer Maschinenbau Rud. Baader GmbH & CO KG, Lubeck, Fed. Rep. of Germany

[21] Appl. No.: 594,931

[22] Filed: Oct. 10, 1990

[30] Foreign Application Priority Data

Oct. 12, 1989 [DE] Fed. Rep. of Germany ....... 3934087

[51] Int. Cl.⁵ .............................................. B30B 9/20
[52] U.S. Cl. ..................................... 100/121; 99/495; 100/156; 100/162 R; 100/173; 452/198
[58] Field of Search .............. 100/110, 116, 121, 118, 100/151–154, 156, 173, 162 R; 99/495; 452/177, 198

[56] References Cited

U.S. PATENT DOCUMENTS

2,365,658 12/1944 Schumacher ...................... 100/121
4,826,595 5/1989 Franke ............................ 100/121 X

FOREIGN PATENT DOCUMENTS

285594 7/1915 Fed. Rep. of Germany .
2159465 11/1972 Fed. Rep. of Germany .
56-114598 9/1981 Japan ................................. 100/118
57-94494 6/1982 Japan ................................. 100/121
58-173098 10/1983 Japan ................................. 100/118

*Primary Examiner*—Harvey C. Hornsby
*Assistant Examiner*—Stephen F. Gerrity
*Attorney, Agent, or Firm*—Fay, Sharpe, Beall, Fagan, Minnich & McKee

[57] ABSTRACT

A presser belt separator for separating a mixture of flowable and non-flowable constituents has a pressure belt that is driven downstream to engage part of a circumferential surface of a perforated drum. A belt pressing structure and a presser roller presses the belt against the surface of the drum to form a draw-in wedge for drawing in the material to be processed between the presser belt and the perforated drum. The belt presser has a surface contour that engages the belt to form a curvature in the central area of the presser belt. The surface contour decreases in curvature from an upstream region of the belt presser to a downstream region thereof. The presser structure is also resiliently urged against the perforated drum by force-adjustable pressure springs.

8 Claims, 1 Drawing Sheet

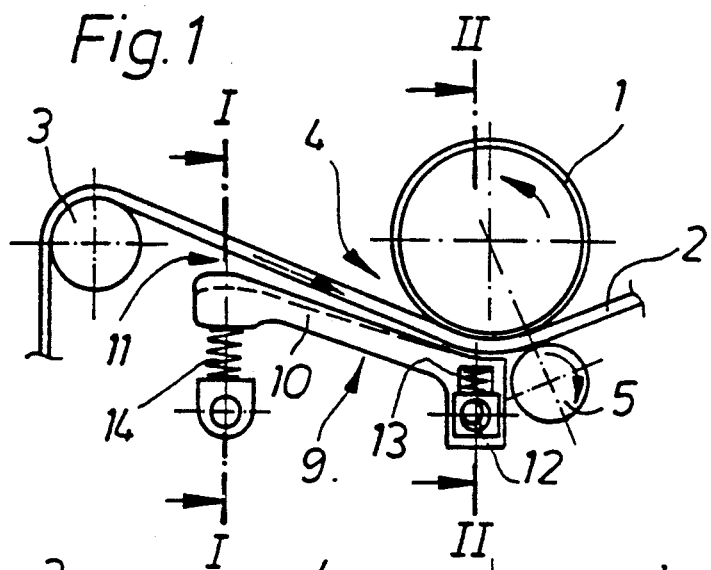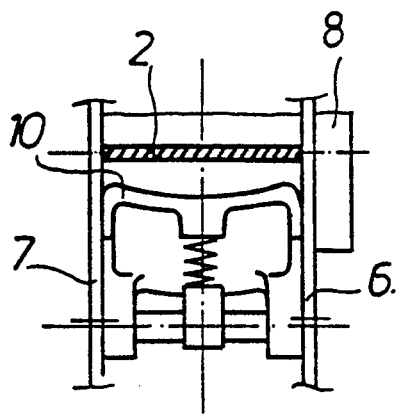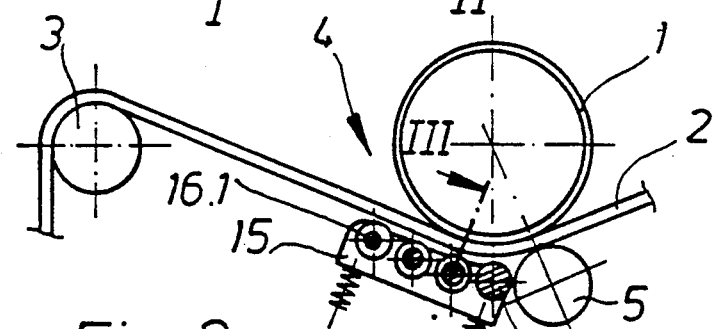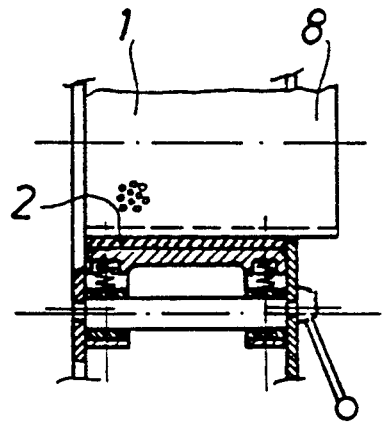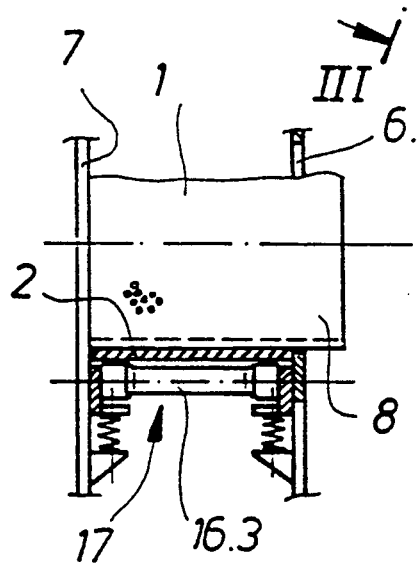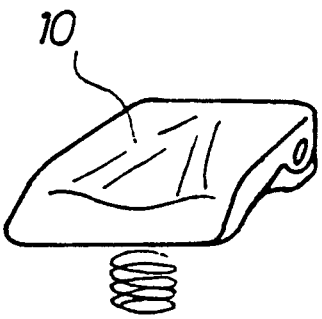

PRESSER BELT SEPARATING APPARATUS

BACKGROUND OF THE INVENTION

1. Field of the Invention

The invention relates to a presser belt separating or mincing apparatus for separating material to be processed including a mixture of flowable and non-flowable constituents, in particular for separating sinews and/or tendons and cartilages from meat portions.

2. Prior Art

From published German Patent Application No. 2 159 465 there is known a presser belt separating apparatus comprising a rotating perforated drum and an elastic presser belt, which encompasses the perforated drum over part of its circumference and is pressed against the circumferential surface by a presser roller, in which apparatus belt pressers for supporting the presser belt in the region of its marginal zones are arranged upstream of the presser roller. These belt pressers are in the shape of skids or runners and adapted to pivot freely about an axis fixed with regard to the frame of the apparatus in the proximity of the presser roller. This axis carries a blocking roller which engages the presser belt as do the belt pressers. Although such structure helps to essentially prevent the leakage flow which is a disadvantage of other known devices of similar type, this structure shows other problems. For example, when large pieces of the material to be processed are supplied in the central area of the presser belt, this will be deformed to an extent that it may slide off from the belt pressers, which immediately leads to the destruction of the presser belt and forms a serious danger for the apparatus as a whole. Moreover, the sliding friction between the support surfaces of the belt pressers and the presser belt lead to a stressing of these components even in normal performance, which will lead to an early destruction of the presser belt and the belt pressers, which destruction is further increased by the thermal influence associated with said friction.

Furthermore, from German Patent 285 594 there can be taken a roller presser for gaining oleo and stearin from molten tallow. In this presser apparatus there is used a rotating, permeable presser cloth which is supported by a series of recessed rollers which are mounted resiliently. A steel belt is arranged to oppose said presser cloth, which steel belt runs over a series of fixedly mounted rollers. The degree of recessing is reduced from one roller to the other up to a cylindrical shape of the last roller. Such a structure, however, is completely unappropriate for the present case of application in separating flowable and non-flowable constituents mixed together in a material to be treated.

SUMMARY OF THE INVENTION

It is a main object of the present invention to widen the field of application of presser belt separating apparatus.

It is a further essential object of the present invention to improve the durability and lifetime of a presser belt.

In a presser belt separating or mincing apparatus for separating material including a mixture of flowable and non-flowable constituents, in particular for separating sinews and/or tendons and cartilages from meat portions, the apparatus being of the type comprising a perforated drum driven to rotate and provided with a perforated circumferential surface; a presser roller; tensioning and pressure means arranged upstream of the presser roller, an elastic presser belt, which encompasses the perforated drum over part of its circumference, being pressed against the circumferential surface by the presser roller and the tensioning of presser means and, together with the circumferential surface, forming a draw-in wedge for the material to be processed; and lateral walls for guiding the presser belt and forming a lateral boundary for the draw-in wedge, these objects are achieved, according to the present invention, by arranging said tension and presser means to be pressed resiliently against the drum essentially radially with respect to the latter under adjustable force, and to extend over the whole width of the presser belt, the tensioning and presser means having a surface shape arranged such as to form a high curvature of the central area of the presser belt in the initial region of the tensioning and presser means, whereas this curvature decreases continuously towards the end of the tensioning and presser means.

The advantages to be obtained thereby essentially reside in that the local deformation and friction forces acting on the presser belt can be limited.

According to a first embodiment of the present invention, the tensioning and presser means may advantageously be provided by way of a known per se presser pad, which has an essentially continuous surface.

According to another particularly expedient embodiment of the present invention, the tensioning and presser means may be arranged by way of a roller grate incorporating a set of support rollers which, in order to achieve the above-mentioned surface shape of strong curvature, have a zone of reduced diameter in their central area in such a manner that the width of this zone differing for the individual rollers becomes smaller the closer a single roller is arranged to said presser roller, such that the final support roller immediately adjacent to said presser roller has the shape of a cylindrical roller.

According to another preferred embodiment of the invention, the presser pad may be formed by way of a sheet metal element or an element manufactured from plastic material by a moulding, stretching, pressing or free forming process. It is particularly advantageous with regard to the lifetime of the presser belt to arrange the tensioning and presser means to move in an oscillating manner essentially perpendicularly with regard to the presser belt, the oscillation movement occurring by a resilient support of the tensioning and presser means on at least one eccentric roller whose drive is derived from the drive of the apparatus.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a simplified side-view of the apparatus according to the present invention by way of a partial representation;

FIG. 2 shows a modified embodiment incorporating different support means but in a representation similar to that of FIG. 1;

FIG. 3 shows a cross-section of the apparatus of FIG. 1 along the section line I—I;

FIG. 4 shows a cross-section through the apparatus of FIG. 1 along the section line II—II;

FIG. 5 shows a cross-section through the apparatus of FIG. 2 along the section line III—III; and FIG. 6 shows an axonometric representation of the presser element used in the embodiment of FIG. 1.

DETAILED DESCRIPTION OF THE PREFERRED EMBODIMENTS

The apparatus according to the present invention forms a portion or component of a separating machine, also called a mincing machine or mincer which portion has been shown in context with two different embodiments in a simplified manner by way of side-views according to FIGS. 1 and 2. These two embodiments have in common a perforated drum 1 being driven to rotate and having a perforated circumferential surface. This drum is surrounded along a part of its circumference by an endless presser belt 2, which is guided by a number of deflection rollers 3 of which only one is shown, this presser belt 2 being guided such that an entrance or draw-in wedge 4 is formed between the presser belt 2 and the perforated drum 1. The end of the area of encompassing is determined by a presser roller 5, which can be adjusted and/or set radially with regard to the drum 1 and can thus press the presser belt 2 against the circumferential surface of the perforated drum 1. The presser belt 2 moves between two lateral walls 6 and 7, which bound the draw-in wedge 4 laterally. One of the lateral walls denoted by reference numeral 6 is penetrated by a shaft portion 8 of the perforated drum 1.

For supporting the inner surface of the presser belt 2, there are arranged tensioning and presser means 9 in the area of the draw-in wedge 4.

In a first embodiment of the present invention as shown in FIGS. 1 and 3, these presser means 9 are formed by a presser pad 10, which, as can be taken from FIG. 6, has a saddle-shape profile in the region of the draw-in wedge 4. The width of this pad 10 corresponds, as can be taken from FIG. 3, essentially to that of presser belt 2. The saddle-shaped profile is formed by a concave recessing or hollowing of the central portion of the surface facing the presser belt 2, this concave recessing area decreasing or narrowing continuously towards the perforated drum 1 and finally ending, in its end region, in a surface which is equidistant to the circumferential surface of the perforated drum 1. Together with the inner side of the presser belt 2, the presser pad 10 forms a wedge 11 opening against the direction of movement of the belt 2, which wedge is spaced in closest approximation to the presser belt just upstream of the presser roller 5, i.e. in this region the width of the wedge approximates the zero value and approximately comes into contact with the presser belt 2 and its position is restricted by non-shown abutments or stops. In the region of its end facing the presser roller 5, the support of the presser pad 10 occurs by means of an eccentric roller 12, on which the presser pad 10 is supported via a pressure spring 13. By turning the eccentric roller 12, the force of the pressure spring 13 can be influenced. The other end of the presser pad 10 also rests on a pressure spring 14, which, also in this region, supports the presser pad 10 in a manner to displace it resiliently.

Regarding now the embodiment represented in FIGS. 2 and 5, the presser pad 10 of FIGS. 1 and 3 is substituted by a roller grate 15, whose support is performed in a similar manner as that of the presser pad. The roller grate 15 is composed of a number of freely rotatable support rollers 16.1 to 16.4, which, in their central area, have an offset zone 17 extending symmetrically with regard to the centre of the roller body. The dimension of the zone 17 with regard to the individual support rollers 16.1 to 16.4 differs in a manner so that its size/dimension decreases upon increasing approximation of the presser roller 5, whereupon in the end, the final support roller 16.4 is formed as a cylindrical roller.

In performance of the apparatus, the perforated drum 1 is driven counterclockwise, and thus material to be processed which is supplied to the draw-in wedge 4 between the presser belt 2 and the perforated drum 1 is drawn in and submitted to increasing pressure, which obtains its maximum in the region of the presser roller 5. Thereby, the flowable constituents flow through the perforations in the circumferential surface of the perforated drum 1 into the interior thereof and can be taken away by a nonshown discharge worm (screw) conveyor. During the drawing-in of the material pieces to be processed there occurs a bulging of the presser belt 2 which depends on the size and stiffness of the individual pieces and which is desirable because it improves the draw-in ability of the apparatus. This bulging is initially only counteracted by a bending resistance resulting from the tension of the presser belt 2. However, when a certain extent of bulging is exceeded, the inner side of the presser belt 2 comes into contact with the tensioning and presser means 9 so that the bulging is restricted to an extent which restricts the following reduction of the width of the presser belt 2 to a predetermined extent. By the shaping and arrangement of the presser means 9 according to the present invention the presser belt 2 has the minimum possibility of being displaced in the marginal zone or region of the belt whereas this possibility is the largest in the centre, which difference is reduced increasingly as the presser belt approaches the perforated drum 1. Accordingly, in the encompassing area of the perforated drum 1 the presser belt 2 is supported by a substantially even and plain surface. Upon exceeding a certain lifting force acting upon the presser belt 2 the presser pad 10 may give way against the force of the pressure springs 13 and 14. Further, least the force of spring 13 is capable of being influenced or adjusted by turning the eccentric shaft (roller) 12.

The frictional forces occurring between the presser belt 2 and the presser pad 10 can be reduced decisively if the eccentric shaft 12 turns by being driven in a clockwise direction. The eccentric lift is expediently divided up such that one part thereof is transformed into changing the pre-tensioning of the pressure spring 13, whereas the remainder is used for an oscillating lift of the presser pad 10. Thereby, a rhythmic pressure is exerted upon the material to be treated, which pressure is overlapped by an accompanying movement of the presser pad 10 during the degrading phase. For optimizing this effect, the rotational speed of the eccentric shaft 12 can be selected such that the average value of the speed vector facing in the direction of movement of the presser belt 2 essentially corresponds to the vector of the presser belt 2.

The other supporting point of the presser pad 10 may be formed in a similar manner as well, i.e. an eccentric shaft is provided, against which the pressure spring 14 is supported. Both eccentric shafts are then driven to rotate synchronously.

Apparently, the same function is obtained with the arrangement of the apparatus as shown in FIG. 2.

What is claimed is:

1. A presser belt separating apparatus for separating material processed in the form of non-flowable and flowable constituents mixed with each other, in particular at least one of sinews, tendons and cartilages from meat portions, said apparatus comprising:

a perforated drum driven to rotate and having a perforated circumferential surface;

a presser belt driven in a downstream direction toward said drum and engaging a portion of said circumferential surface;

a presser roller;

tensioning and presser means for tensioning and pressing said presser belt arranged upstream of said presser roller with respect to the direction in which said presser belt is driven;

said presser belt being pressed against said circumferential surface by said presser roller and said tensioning and said presser means and, together with said circumferential surface, forming a draw-in wedge for drawing in the material to be processed between the presser belt and the perforated drum;

lateral walls for guiding said presser belt and forming a lateral boundary for said draw-in wedge;

means for pressing with adjustable force said tensioning and presser means against said drum in a substantially radial direction with respect to said drum;

said presser belt having a width extending in a direction between said lateral walls and a central area along a midportion of said width; and said tensioning and presser means extending over said width of said presser belt and having a surface contour engaging said belt that forms a curvature in the central area of said presser belt at an upstream region of said tensioning and presser means, said surface contour decreasing in curvature from said upstream region of said tensioning and pressure means toward a downstream region of said tensioning and presser means.

2. An apparatus as claimed in claim 1, wherein said tension and presser means is a presser pad.

3. An apparatus as claimed in claim 2, wherein said presser pad is formed of sheet metal.

4. An apparatus as claimed in claim 2, further comprising means for resiliently supporting said tensioning and presser means including at least one eccentric roller having drive means drivingly connected with means for driving said presser belt and said perforated drum, said eccentric roller driving said tensioning and presser means in oscillating motion substantially perpendicular with respect to said presser belt.

5. An apparatus as claimed in claim 1, wherein said tension and presser means is a presser pad manufactured from plastic material by one of a molding, stretching, pressing and free forming process.

6. An apparatus as claimed in claim 1, wherein said tensioning and presser means comprises a roller grate having a set of support rollers, a plurality of said support rollers having a zone of reduced diameter along a midportion of the roller, the width and depth of the zone differing for each of said plurality of rollers such that an upstream most one of said plurality of rollers has a maximum zone width and depth and the remainder of said plurality of rollers downstream from said one roller have a zone width and depth that progressively decreases in the downstream direction from said one roller, and said set of support rollers further including a final downstream support roller immediately adjacent to said presser roller having the shape of a cylindrical roller.

7. An apparatus as claimed in claim 6, further comprising means for resiliently supporting said tensioning and presser means including at least one eccentric roller having drive means drivingly connected with means for driving said presser belt and said perforated drum, said eccentric roller driving said tensioning and presser means in oscillating motion substantially perpendicular with respect to said presser belt.

8. An apparatus as claimed in claim 1, further comprising means for resiliently supporting said tensioning and presser means including at least one eccentric roller having drive means drivingly connected with means for driving said presser belt and said perforated drum, said eccentric roller driving said tensioning and presser means in oscillating motion substantially perpendicular with respect to said presser belt.

* * * * *